United States Patent [19]

Scotti

[11] Patent Number: 4,736,616
[45] Date of Patent: Apr. 12, 1988

[54] PRESS FOR SPLICING THE ENDS OF CABLES, ROPES, AND THE LIKE

[75] Inventor: Marino D. Scotti, Milan, Italy

[73] Assignee: Douglas Marine s.r.l., Milan, Italy

[21] Appl. No.: 947,625

[22] Filed: Dec. 30, 1986

[30] Foreign Application Priority Data

Jan. 3, 1986 [IT] Italy .................... 20408/86[U]

[51] Int. Cl.$^4$ ............................................. B21D 37/14
[52] U.S. Cl. ........................................ 72/472; 72/477; 72/446
[58] Field of Search ............... 72/472, 477, 407, 389, 72/446, 448

[56] References Cited

U.S. PATENT DOCUMENTS

| | | | |
|---|---|---|---|
| 1,772,600 | 8/1930 | Dorman | 72/31 |
| 2,774,269 | 12/1956 | Demler et al. | 72/472 |
| 4,043,174 | 8/1977 | Paolino | 72/472 |
| 4,132,101 | 1/1979 | Abramson | 72/472 |
| 4,242,903 | 1/1981 | Ledford et al. | 72/448 |
| 4,510,789 | 4/1985 | Tomioka et al. | 72/472 |

FOREIGN PATENT DOCUMENTS

141317 11/1980 Japan .................... 72/477

*Primary Examiner*—Robert L. Spruill
*Assistant Examiner*—David B. Jones
*Attorney, Agent, or Firm*—Bucknam and Archer

[57] ABSTRACT

A press for splicing the ends of cables, ropes and the like is described. The press is of the type which utilizes an hydraulic cylinder (5) positioned vertically and resting on a base (6). An upper frame (8) comprises a plate (9) which is fixed to the hydraulic cylinder. The piston of the cylinder has a stem which protrudes from the plate. The frame additionally comprises two lateral plates (10) opposite one to the other and arranged in the shape of a "U" and an upper plate (11) which provides support pressure. Each of the lateral plates has an opening and a loader is inserted within the openings. The loader consists of two half-matrixes, which have a plurality of notches of different diameters whereby when the half-matrixes are approached one to the other a plurality of shaped openings of different diameters is formed.

4 Claims, 2 Drawing Sheets

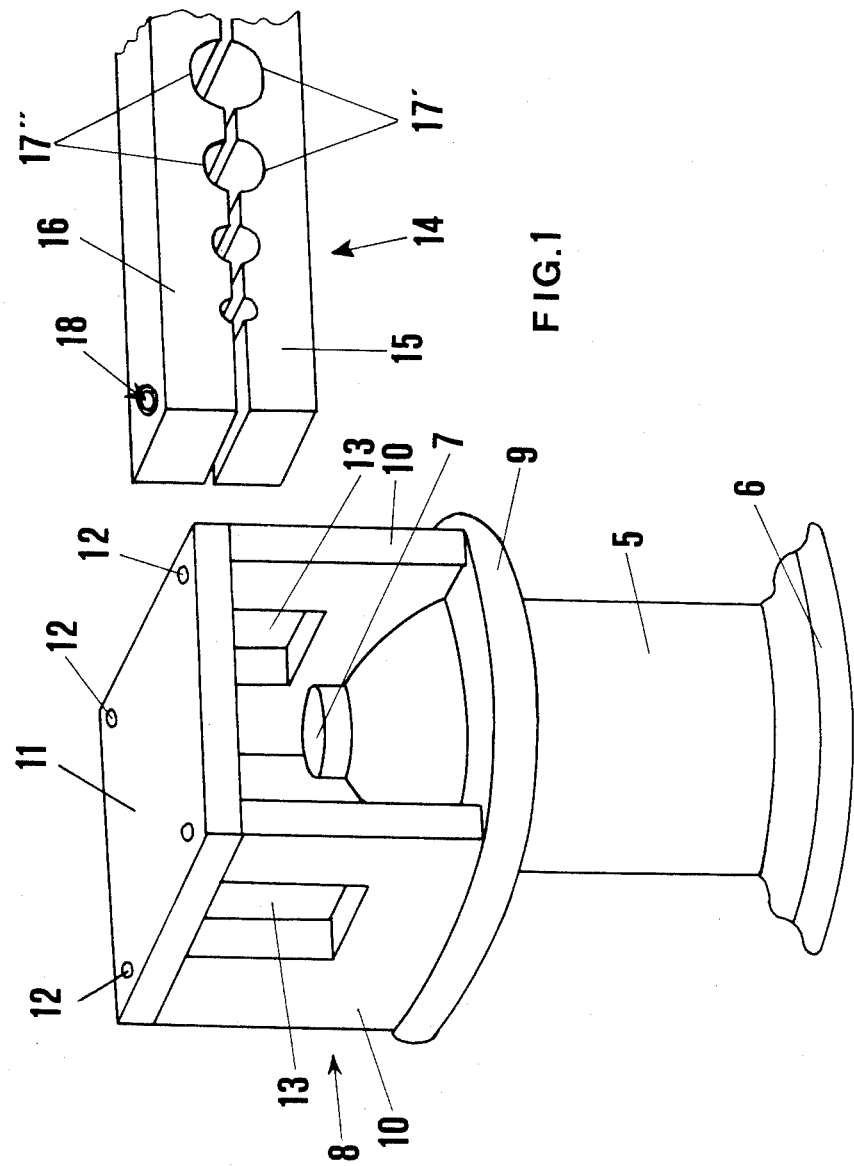

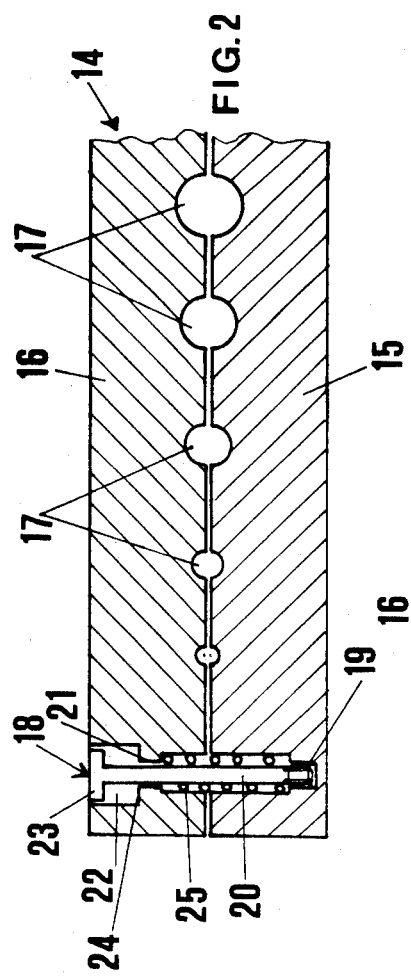
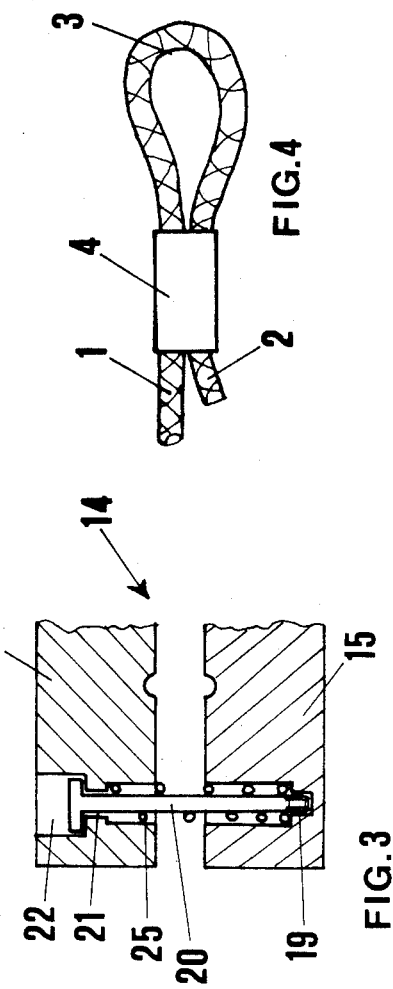
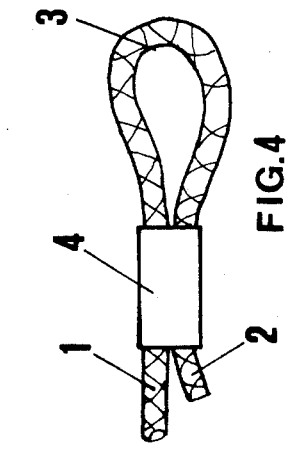

PRESS FOR SPLICING THE ENDS OF CABLES, ROPES, AND THE LIKE

The present invention relates to a press for locking couplings used in splicing the ends of cables, ropes and the like. More specifically, the term "splicing" operation means the operation which consists of turning the end of a cable, for instance, a cable made of steel on itself in order to apply a metallic coupling on both ends of the cable which have been superimposed and locking the coupling on the cable in order to obtain a loop.

In order to lock with pressure the coupling on the cable, several devices are known commercially. For instance, there are utilized tongs which have very long arms in order to decrease the force required during the operation. The main drawbacks of these tongs are that they always require high force to be operated, they must have large dimensions and have a limited number of shaped holes to work on the same number of diameters of cables.

There are also known hydraulic presses, usually with interchangable matrixes. These presses are quite expensive particularly because it is necessary to have a series of matrixes, one for each diameter of the cable to be spliced so that there are substantial dead times during the substitution. In order to avoid misalignment during the pressing operation, complex and expensive guiding devices are placed on the matrixes as well as on the frame of the press.

An object of the present invention is to eliminate the drawbacks of the known devices.

Another object is to provide a press of modest cost which may be utilized essentially with every diameter of cable.

Another object of the present invention is to eliminate the complex guiding devices which have been used with matrixes of the known presses as well as to eliminate the dead time conventionally required for the preparation of the press.

The splicing press according to the present invention is of the type of an hydraulic cylinder and comprises a frame which has a base consisting of a perforated plate. The base is integral with the upper part of the cylinder. The press also comprises two side plates opposite one to the other in the shape of a "U" and an upper plate for support pressure. The loader slides in the holes of the two plates arranged in the shape of a "U". The loader consists of two half-matrixes held coupled and each has a plurality of notches arranged one opposite to the other so that in the operation of maximum approachment between the half matrixes a plurality of shaped openings of different dimensions is formed.

The two half-matrixes of the loader are held coupled by means of suitable constraining devices which could have screws or bolts, fixed for instance, by screwing into the openings provided in the lower half-matrix and placed in guiding holes located in the upper half-matrix so as to provide separation and approachment of the two half-matrixes. Ordinarily, the two half-matrixes are held separate, one from the other by springs located around the stems of the fixing screws.

The hydraulic cylinder may be the common jack used with cars which is produced in large amounts and is, therefore, very inexpensive.

Other features of the press according to the present invention will appear more clear from the following detailed description with reference to the drawings which are provided by way of illustration, of which:

FIG. 1 is a schematic axonometric view of the press according to the invention;

FIGS. 2 and 3 are partial views in cross section of the loader used with the press of FIG. 1, showing respectively the two half-matrixes in the position of maximum approachment and maximum separation one from the other;

FIG. 4 illustrates a typical example of the splicing of the end of a cable.

FIG. 4 shows the splicing of the end of a cable, a rope or the like. The end 2 of cable 1 is turned over in such a manner to form a loop 3. Metallic coupling 4 is applied on the two sections of the cable which have been superimposed and the coupling is then pressed on the cable in order to hold the end 2 and to prevent the opening of the loop 3.

FIG. 1 illustrates the press according to the present invention which is used to press the coupling 4 on the respective cables and which may be used with cables of substantially different diameters.

The press comprises hydraulic jack 5 placed vertically on rest base 6. The stem 7 of the piston of the jack protrudes from the upper part.

FIG. 1 does not illustrate the devices being used for controlling the jack 5 because they are known in the art.

Preferably, the jack 5 is the well known jack used with cars, in the form of a crick or jackscrew produced in large amounts and, therefore, of relatively low cost. Frame 8 is mounted on the upper part of jack 5 and consists of base 9 fixed to the jack 5, for instance, by soldering, with stem 7 protruding from the base 9. The frame also comprises two side plates 10 opposite one to the other in the shape of a "U" and an upper plate 11 providing support pressure during the pressing operation.

FIG. 1 illustrates the upper plate 11 which is held attached to the plates 10 which have the shape of a "U" by means of screws 12 but it is obvious that they could be held together by other means, for instance, by soldering. The loader 14 is inserted in the openings 13 of the plates having the shape of a "U". The loader 14 consists of two half-matrixes designated by numerals 15 and 16 respectively. The upper and lower half-matrixes have opposite half-openings 17' and 17" which in the operation of maximum approachment shown in FIG. 2 form shaped opening 17, shown according to increasing diameter but it is clear that other arrangements are possible within the scope of the invention.

The two half-matrixes 15 and 16 are held in reciprocal engagement by a pair of end screws 18 of which only one is shown in FIGS. 1 and 2. Each screw 18 is screwed in a respective threaded opening 19 which is provided in the lower half-matrix 15, while the stem 20 is guided into openings 21 which is provided in the upper half-matrix. Opening 22 is provided above the opening 21 and has a greater diameter. The head 23 of each screw 18 is seated in the opening 22. The step 24 between the opening 21 and 22 serves as a shoulder for the head of screw 18.

Numeral 25 designates the spring which is placed around the stem 20 of the screws 18 and which serves to keep the half-matrixes 15 and 16 separated one from the other, which half-matrixes under normal conditions are arranged as shown in FIG. 3.

In order to carry out the splicing operation, the shaped hole 17 of diameter appropriate for the corresponding cable is placed on the vertical line which goes through the axis of the stem 7 of the piston of the jack 5.

Coupling 4 is inserted in the opening 17 and the pressing operation is carried out by causing the stem 7 to rise up to the point to cause the two half-matrixes 15 and 16 to close as shown in FIG. 2.

After the pressing operation, springs 25 which are compressed, cause the separation of half-matrixes 15 and 16 and at the same time, they push the stem 7 downwardly.

It is interesting to note that the loader 14 does not require any guiding system in order to prevent misalignment between the two half-matrixes 15 and 16 in addition to the fixing screws 18. Further, transversal misalignments between the half-matrixes are prevented also due to the lateral walls of the openings 13 in which loader 14 is seated.

The press according to the present invention offers undisputable advantages with respect to the presses known in the art because it may be utilized with cables and ropes to be spliced of any diameter without requiring laborious substitutions of the matrixes, thus also eliminating the dead time involved in this substitution.

The device according to the present invention is particularly inexpensive both with respect to its structural components as well as with respect to the elimination of the guides of the matrixes which are necessary in the known presses, guides which require laborious mechanical operations.

In addition, loader 14 may be substituted by another device used to shear cables, ropes and the like, thus increasing the versatility of the press.

It should be stated that several modifications of details may be made with respect to the splicing press as illustrated in the drawings without departing from the scope of the invention.

What is claimed is:

1. A press for splicing the ends of cables and ropes, wherein the ends of said cables and ropes are turned over and a coupling locks the ends under pressure, which comprises a first base, an hydraulic cylinder positioned vertically and resting on said base, a frame mounted on the upper part of said cylinder, said frame comprising a plate providing a second base, said second base being fixed to said hydraulic cylinder, said cylinder having a piston with stem, said stem protruding through the second base, said frame comprising two U-shaped side plates extending upwardly from said second base and opposite one to the other, an upper plate disposed above said side plates, each of said side plates having a first opening, a loader inserted within said first openings, said loader consisting of two half-matrixes, means for holding said half-matrixes in reciprocal engagement during operation of the press, wherein said means are screws, each of said screws having a shank and a head, said shanks having an end, said ends being fixed in threaded second openings provided in the lower half-matrixes, said heads being seated into third openings provided in said upper matrixes, said shanks being guided into fourth openings provided in said upper half-matrixes, said fourth openings being smaller than said third openings, whereby a shoulder is formed for said heads of said screws between said third and said fourth openings, said half-matrixes having a plurality of notches of different diameters whereby when said half-matrixes are approached one to the other during operation of the press a plurality of shaped openings of different diameters is formed, the coupling is inserted into one of said shaped openings and the stem of said piston rises to cause the half-matrixes to close.

2. The press according to claim 1 which comprises springs located between said upper and lower half-matrixes, said springs surrounding said shank of said screw.

3. The press according to claim 1 wherein said upper plate is fixed to said lateral plates by means of screws.

4. The press according to claim 1 wherein said upper plate is fixed to said lateral plates by soldering.

* * * * *